US009052973B2

(12) United States Patent
Oddiraju (10) Patent No.: US 9,052,973 B2
(45) Date of Patent: Jun. 9, 2015

(54) INTER-PROCESS COMMUNICATION MECHANISM

(75) Inventor: Chandar Kumar Oddiraju, Cupertino, CA (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 3075 days.

(21) Appl. No.: 11/267,286

(22) Filed: Nov. 7, 2005

(65) Prior Publication Data

US 2007/0106996 A1    May 10, 2007

(51) Int. Cl.
  *G06F 9/54*    (2006.01)
  *G06F 12/02*   (2006.01)

(52) U.S. Cl.
  CPC ............ *G06F 9/543* (2013.01); *G06F 12/0284* (2013.01); *G06F 9/544* (2013.01)

(58) Field of Classification Search
  CPC .......................... G06F 11/3612; G06F 12/0284
  USPC ....................................................... 719/328
  See application file for complete search history.

(56) References Cited

U.S. PATENT DOCUMENTS

| 5,437,031 | A | * | 7/1995 | Kitami .......................... 719/312 |
| 5,652,885 | A | * | 7/1997 | Reed et al. ........................ 713/1 |
| 6,161,148 | A |   | 12/2000 | Pratt et al. |
| 6,687,702 | B2 |   | 2/2004 | Vaitheeswaran et al. |
| 2002/0144006 | A1 | * | 10/2002 | Cranston et al. .............. 709/312 |
| 2005/0097296 | A1 | * | 5/2005 | Chamberlain et al. ........ 711/170 |

OTHER PUBLICATIONS

International Search Report of Application No. PCT/US2006/041804 mailed Jul. 27, 2007.
Bach: "Design of the Unix Operating System" 1986, Prentice Hall, New Jersey, USA, XP002441314, pp. 359-372.

* cited by examiner

*Primary Examiner* — H S Sough
*Assistant Examiner* — Syed Roni
(74) *Attorney, Agent, or Firm* — Lowe, Hauptman, Gilman & Berner, LLP (57) ABSTRACT

A system and method of inter-process communication are described. An IPC process executable by a processing device includes data storage, a message receiver, a data extractor, and a message transmitter. The data storage is accessible by a second process without interaction of the IPC process and is configured to enable the second process to allocate storage space for data from a third process. The message receiver is configured to receive a message including a reference to data stored in the data storage by the third process. The data extractor is configured to access the data storage and to retrieve the data referenced by the message received by the message receiver. The message transmitter is configured to transmit a message including a reference to data retrieved by the data extractor.

15 Claims, 7 Drawing Sheets

INTER-PROCESS COMMUNICATION MECHANISM

FIELD

The disclosed embodiments relate to an inter-process communication mechanism.

BACKGROUND

Multiple methods exist for inter-process communication (IPC). Different operating systems (OS) support one or more different IPC mechanisms. Specific IPC mechanisms supported by the WINDOWS OS available from Microsoft Corporation of Redmond, Wash. are clipboard, object linking and embedding (OLE)/component object model (COM), data copy, DDE, file mapping, mail slots, pipes, remote procedure call (RPC), and WINDOWS sockets.

Clipboard, OLE/COM, DDE, mail slots, RPC, and WINDOWS sockets require a greater amount of overhead than the other mechanisms, i.e., additional resources such as communication bandwidth, setup time, communication time, etc.

Data copy, file mapping, and pipes are not useable for synchronous communication. That is, by using one of these mechanisms, communicating processes must use a synchronization object, such as a semaphore, in order to prevent data corruption in a multitasking environment.

SUMMARY

The present embodiments provide an inter-process communication mechanism.

An apparatus embodiment includes an IPC process executable by a processing device includes data storage, a message receiver, a data extractor, and a message transmitter. The data storage is accessible by a second process without interaction of the IPC process and is configured to enable the second process to allocate storage space for data from a third process. The message receiver is configured to receive a message including a reference to data stored in the data storage by the third process. The data extractor is configured to access the data storage and to retrieve the data referenced by the message received by the message receiver. The message transmitter is configured to transmit a message including a reference to data retrieved by the data extractor.

A method embodiment of inter-process communication includes requesting a second process to allocate storage in a first process space, storing a data message in the allocated storage in the first process space responsive to receipt of a reference to the allocated storage from the second process, and transmitting a second message to the first process wherein the second message includes the reference to the allocated storage.

Still other advantages of the embodiments will become readily apparent to those skilled in the art from the following detailed description, wherein the preferred embodiments are shown and described, simply by way of illustration of the best mode contemplated of carrying out the invention. As will be realized, the invention is capable of other and different embodiments, and its several details are capable of modifications in various obvious respects, all without departing from the embodiments.

DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION

Figure 1:
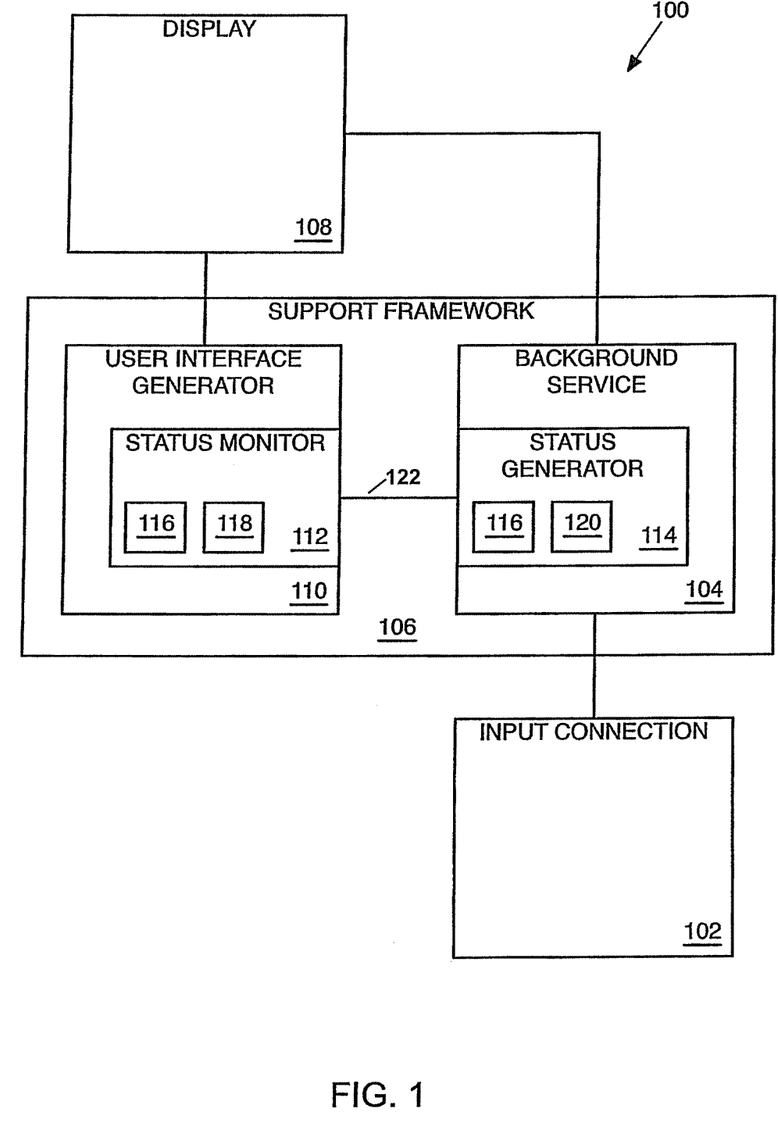
FIG. 1 is a high level block diagram of an example embodiment.

FIG. 1 depicts a high level functional diagram of a portion of an exemplary processing device 100 according to an embodiment. As depicted, processing device 100 is a multi-media playback device including an input connection 102 for receiving media of one or more types for processing by a background service 104 executing as part of a support framework 106. Background service 104 transmits processed media to display 108 for display to a user. Support framework 106 also includes a user interface generator 110 connected with background service 104 and display 108. User interface generator 110 causes display 108 to display a user interface including status information and/or command entry points to the user. In an embodiment, user interface generator 110 causes display 108 to display at least a portion of a user interface at the same time background service 104 causes display of media by the display.

During operation of device 100, a status monitor 112 of user interface generator 110 monitors the status of media processing by background service 104 via inter-process communication (IPC) with a status generator 114 in the background service. The IPC mechanism of an embodiment enables status generator 114 to provide status information to status monitor 112 with requiring synchronization between the state generator and the status monitor. For example, during media playback on display 108 by device 100, the user may wish to display a time code status on the display indicating the current position of the displayed media in the media playback duration. That is, the user may wish to know how much time is left of a movie playback by way of on-screen display.

In an embodiment, status monitor 112 and status generator 114 are an IPC COM object, i.e, a set of executable instructions forming a software executable process according to the component object model framework, instantiated by user interface generator 110 and background service 104, respectively. Background service 104 instantiates status generator 114 as an IPC COM server object for providing predetermined status information, e.g., current state of media playback, to IPC COM client objects. In an embodiment, status generator 114 includes a unique session identifier (ID) 116 enabling communication between IPC COM server object and IPC COM client objects. If multiple IPC COM server objects are instantiated, the unique session ID 116 enables matching of clients to servers and vice versa.

The Component Object Model (COM), available from Microsoft Corporation, is a platform-independent, distributed, object-oriented system for creating binary software components that can interact. COM specifies an object model and programming requirements that enable COM objects (also referred to as COM components or objects) to interact with other objects. COM enables an object to expose functionality to other components and to host applications. The host application can have been written in other languages and may be structurally quite dissimilar, but still host the COM object to make use of COM exposed functionality. According to an embodiment, the present embodiment is developed inside the COM object and exposes methods to use the present IPC COM mechanism by the host application. The host application instantiates the COM object within the application's process and uses the exposed methods to communicate the data to outside the application's process.

In an embodiment, support framework 106 is an operating system (OS). In a specific embodiment, support framework 106 is the WINDOWS OS available from Microsoft Corporation. After the host application, either background service 104 or user interface 110, instantiates the IPC COM object, the host application passes a session ID 116 to the instantiated IPC COM object, e.g., via an exposed IPC COM object method. IPC COM object acting as a server, e.g., as in status generator 112, uses the session ID 116 as a communication method identifier, by creating a window with Session ID as its caption. Then, the IPC COM server object is ready to accept new registrations from one or more IPC COM client objects, e.g., status monitor 112. Status monitor 112 queries support framework 106 to obtain the status generator communication method identifier such as a window having session ID 116. Upon receiving a valid response from support framework 106, status monitor 112 passes a communication method reference such as a window handle to status generator 112 to register for data communication.

Each instantiated IPC COM object, i.e., status monitor 112 and status generator 114, includes a memory space within the respective process space, status monitor (SM) memory space 118 and status generator (SG) memory space 120, respectively. Support framework 106 and status monitor 112 are able to access memory locations within SM memory space 118 and the support framework and status generator 114 are able to access memory locations within SG memory space 120. Support framework 106 allocates memory within SM memory space 118 responsive to allocation requests from status monitor 112 and status generator 114.

After instantiation, status monitor 112 and status generator 114 communicate using connection 122, e.g., an RPC connection between the processes 112, 114.

When the IPC COM client object is instantiated, the object queries support framework 106 to find the server window having the corresponding session ID 116. If the query returns a valid window handle, the IPC COM client object registers with the IPC COM server object. In some cases, the IPC COM server object is not ready or does not exist and the client waits for the server notification from support framework 106. In the case where the IPC COM server object launches after the IPC COM client object, upon creating the session ID window the server requests support framework 106 to broadcast the server object existence in the form of notification to all windows in the support framework. After an IPC COM client object receives the notification, the client object retries registering with the server object. The IPC COM server object monitors the existence of the registered IPC COM client object's process before passing the registration data. In the case where the IPC COM client object process does not exist, the server object un-registers and removes such IPC COM client objects from the server object's' registration data. When the server is shutting down, the server object informs the server object's clients that the server object is shutting down. When the IPC COM server object is not running IPC COM client object do not receive any data from the server object.

Figure 2A:
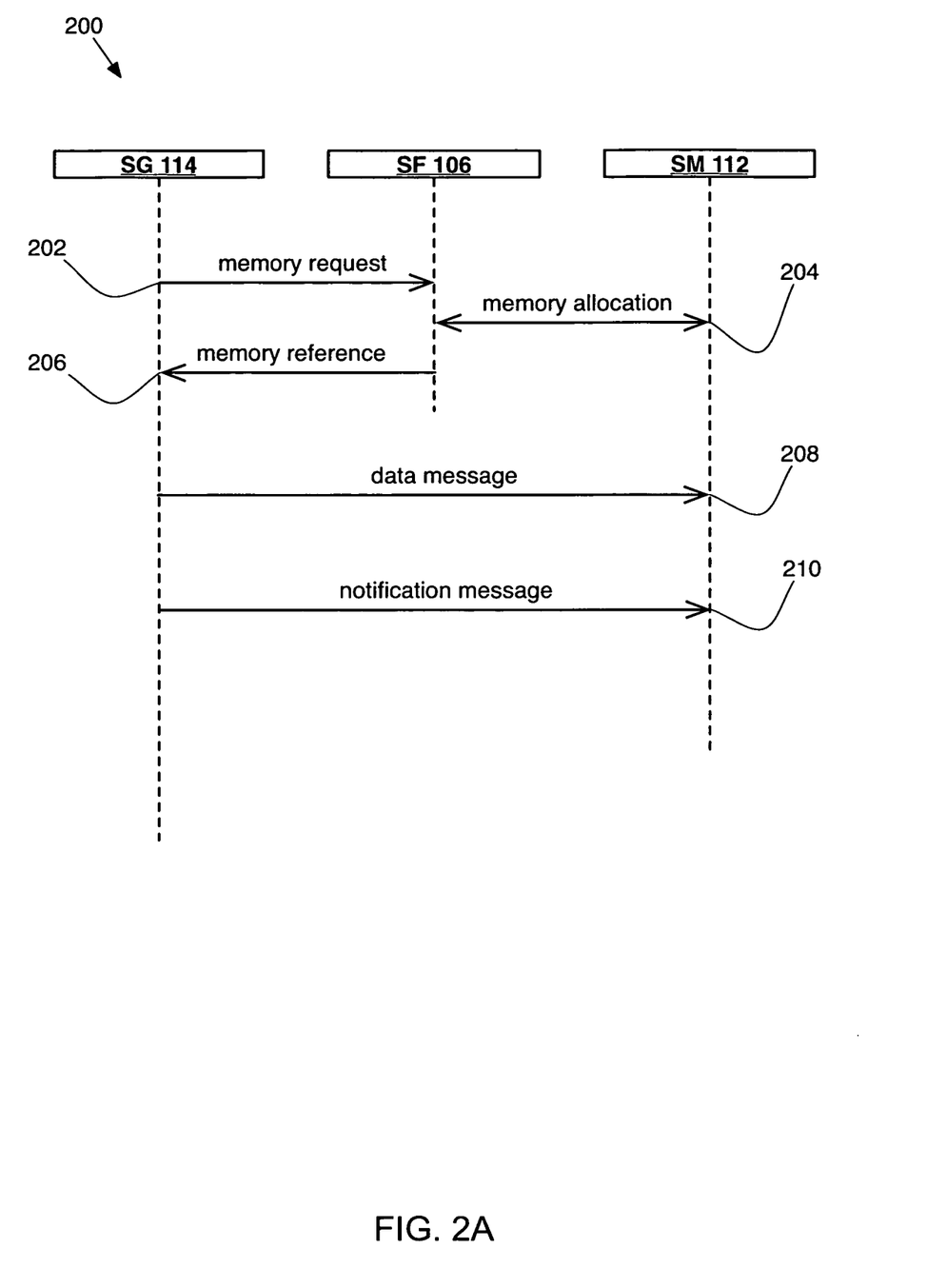
FIGS. 2A and 2B are a message sequence chart of an example message flow of an embodiment.
Figure 2B:
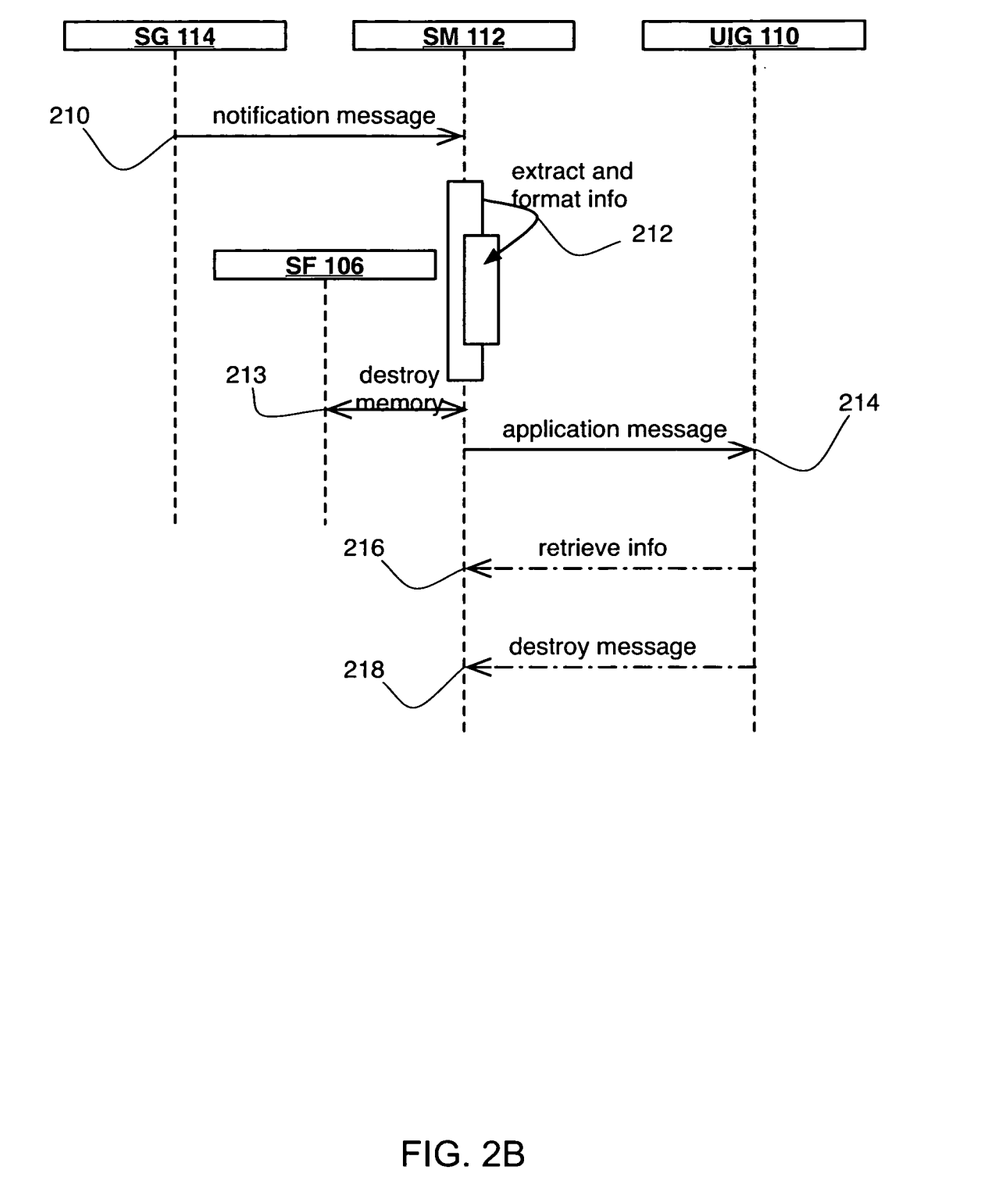

FIGS. 2A and 2B depict a message sequence chart 200 of the flow of messages between status generator 114, support framework 106, status monitor 112, and user interface generator 110 in communicating status information for display on display 108. Time proceeds downward along the page toward the bottom.

FIG. 2A depicts a portion of the message sequence chart covering the provision of status information from status generator 114 to status monitor 112. According to an example embodiment and assuming background service 104 generates status information which is provided to/obtained by status generator 114, the status generator communicates the status information to be displayed on display 108. Status generator 114 formats the status information suitable to communicate to status monitor 112. Status generator 114 transmits a memory allocation request message (message sequence 202) to support framework 106. The memory allocation request message includes the amount of memory required based on the status information and the IPC COM client object, e.g., as identified by a client object process ID, where the memory needs to be allocated.

Responsive to receipt of the memory allocation request message from status generator 114, support framework 106 causes allocation of the requested memory within status monitor 112 (message sequence 204). In an embodiment, support framework 106 is able to directly allocate the request memory within status monitor 112.

After completion of the memory allocation, support framework 106 returns (message sequence 206) reference to the allocated memory in status monitor 112 to status generator 114.

Responsive to receipt of the message including the memory reference, status generator 114 uses the memory reference to store (message sequence 208) the formatted status information in status monitor 112.

After storing the status information, status generator 114 transmits (message sequence 210) a notification message, including the reference to the memory of status monitor 112 storing the status information, to the status monitor.

At this point in the message flow, state generator 114 has transmitted status information to status monitor 112 without having to wait on a reply from the status monitor. Further, after transmitting the notification message to status monitor 112, status generator 114 is freed up to continue with other communications and processing.

FIG. 2B depicts a further portion of the message sequence chart 200 covering the provision of status information from status generator 114 to status monitor 112. For clarity, message sequence 210 (described above with respect to FIG. 2A) is repeated in FIG. 2B for context only.

Responsive to receipt of the notification message from status generator 114 (message sequence 210), status monitor 112 uses the memory reference included in the notification message to extract (message sequence 212) the status information stored in the referenced memory location. In an embodiment, status monitor 112 formats the status information for presentation to the instantiating software executable, i.e., user interface generator 110.

After extracting the status information from the referenced memory location, status monitor 112 communicates an application message to user interface generator 110 and requests (message sequence 213) support framework 106 to destroy the memory location to which status generator 114 previously stored the status information. In an embodiment, the application message includes the extracted and formatted status information.

In a further embodiment assuming application message does not include the extracted and formatted status information, user interface generator 110 communicates (message sequence 216, dot-dashed line) a retrieve status information message to status monitor 112. Similarly, if user interface generator 110 does not need the status information or if the generator received the information as part of the application message (message sequence 214), the user interface generator communicates (message sequence 218, dot-dashed line) a destroy message to status monitor 112. After receipt of a destroy message from user interface generator 110, status monitor 112 de-allocates the referenced memory location from SM memory space 118. In an embodiment, status monitor 112 erases the contents of the referenced memory location in SM memory space 118 in response to receipt of the destroy message.

Figure 3:
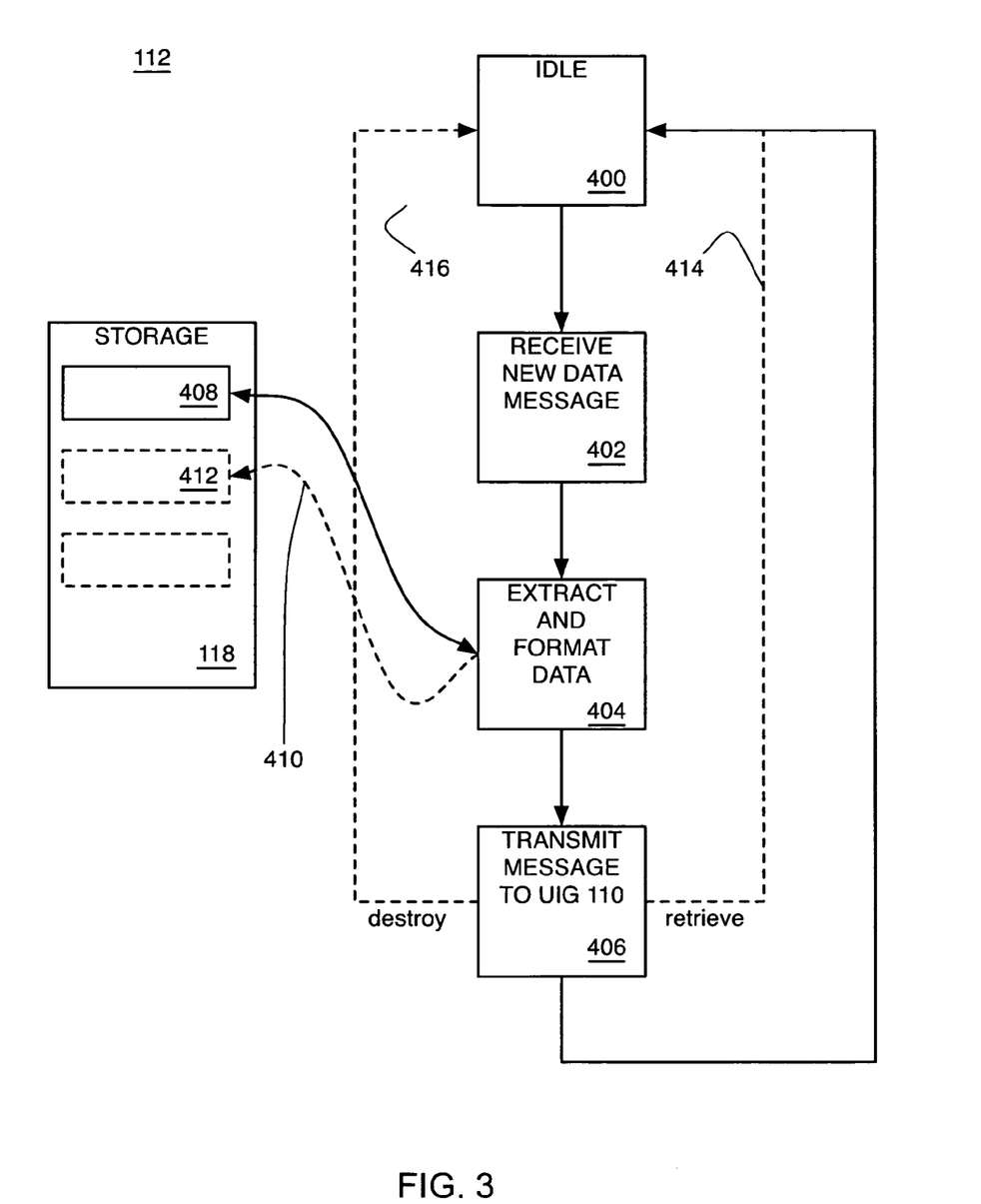
FIG. 3 is a process flow diagram of an embodiment.

FIG. 3 depicts a high level process flow diagram of at least a portion of the flow of control of status monitor 112. That is, FIG. 3 depicts, at a high level, the execution of a set of executable instructions specifying the operation of an instantiated IPC COM object, i.e., status monitor 112. The flow of control begins at idle step 400 and transitions to step 402 wherein status monitor 112 receives a notification message (message sequence 210 of FIG. 2A) from status generator 114.

After receipt of the notification message, the flow proceeds to step 404 and status monitor 112 extracts (message sequence 212 of FIG. 2B) the status information from the contents of a memory location 408 in SM memory space 118 as specified by the reference provided to the status monitor by status generator 114 in the notification message. The notification message includes a reference to the memory location in SM memory space 118 at which status generator 114 previously stored the status information, as described above.

During execution of step 404, status monitor 112 formats the extracted status information according to one or more data types to be communicated with user interface generator 110. In an embodiment, data type information is stored in memory location 408 along with the status information. Status monitor 112 stores the formatted, status information in memory location 408.

The data set communicated by status generator 114 contains the type of information, e.g., the status information type, being communicated and how the data is arranged in a stream of bytes. Each set of data communicated is prefixed with information including the data type and data size along with the actual data value. When status monitor 112 receives the data, the status monitor reads the prefixed information first and determines what type of status information was received and the data types. Then, status monitor 112 recreates the actual data types using the value(s) based on the stream of bytes.

In another embodiment (indicated by dashed line 410), status monitor 112 stores the formatted status information into a memory location 412 different from memory location 408 from which the information was retrieved. After extracting the information from memory location 408, status monitor 112 requests (message sequence 213 of FIG. 2B) support framework 106 to destroy the memory location 408. Support framework 106 uses the same context rules which were used to create the memory location in order to destroy the allocated memory location and to ensure proper memory release. Every time status generator 114 requests allocation of memory from support framework 106, the memory reference 408 will not be the same. Status generator 114 requests support framework 106 for a new memory location reference with which to communicate information. Status generator 114 never retains a previous, i.e., an old, memory reference. By not retaining previously allocated memory references, status generator 114 minimizes the possibility for inadvertently modify the status information in the status monitor 104 memory location 408.

After extracting and formatting the status information, the flow proceeds to step 406 and status monitor 112 communicates the application message (message sequence 214 of FIG. 2B) to user interface generator 110. As described above in an embodiment, status monitor 112 transmits the application message including a reference to formatted status information in memory location 412 in SM memory space 118.

If the application message transmitted to user interface generator 110 included the status information, the flow of control proceeds to return to step 400.

In accordance with another embodiment (indicated by dashed retrieve line 414), after status monitor 112 transmits the application message to user interface generator 110, the status monitor receives a retrieve information message (message sequence 216 of FIG. 2B) including a reference to a memory location, e.g., 412, in SM memory space 118 from the user interface generator. Responsive to receipt of the retrieve information message, status monitor 112 retrieves the status information from the referenced memory location and communicates the status information to user interface generator 110 and proceeds to return to step 400.

In accordance with another embodiment (indicated by dashed destroy line 416), after status monitor 112 transmits the application message to user interface generator 110, the status monitor receives a destroy information message (message sequence 218 of FIG. 2B) including a reference to a memory location, e.g., 412, in SM memory space 118 from the user interface generator. Responsive to receipt of the destroy information message, status monitor 112 destroys the status information from the referenced memory location and proceeds to return to step 400. As described above and in another embodiment, status monitor 112 erases the status information and de-allocates the referenced memory location responsive to the destroy information message.

Figure 4:
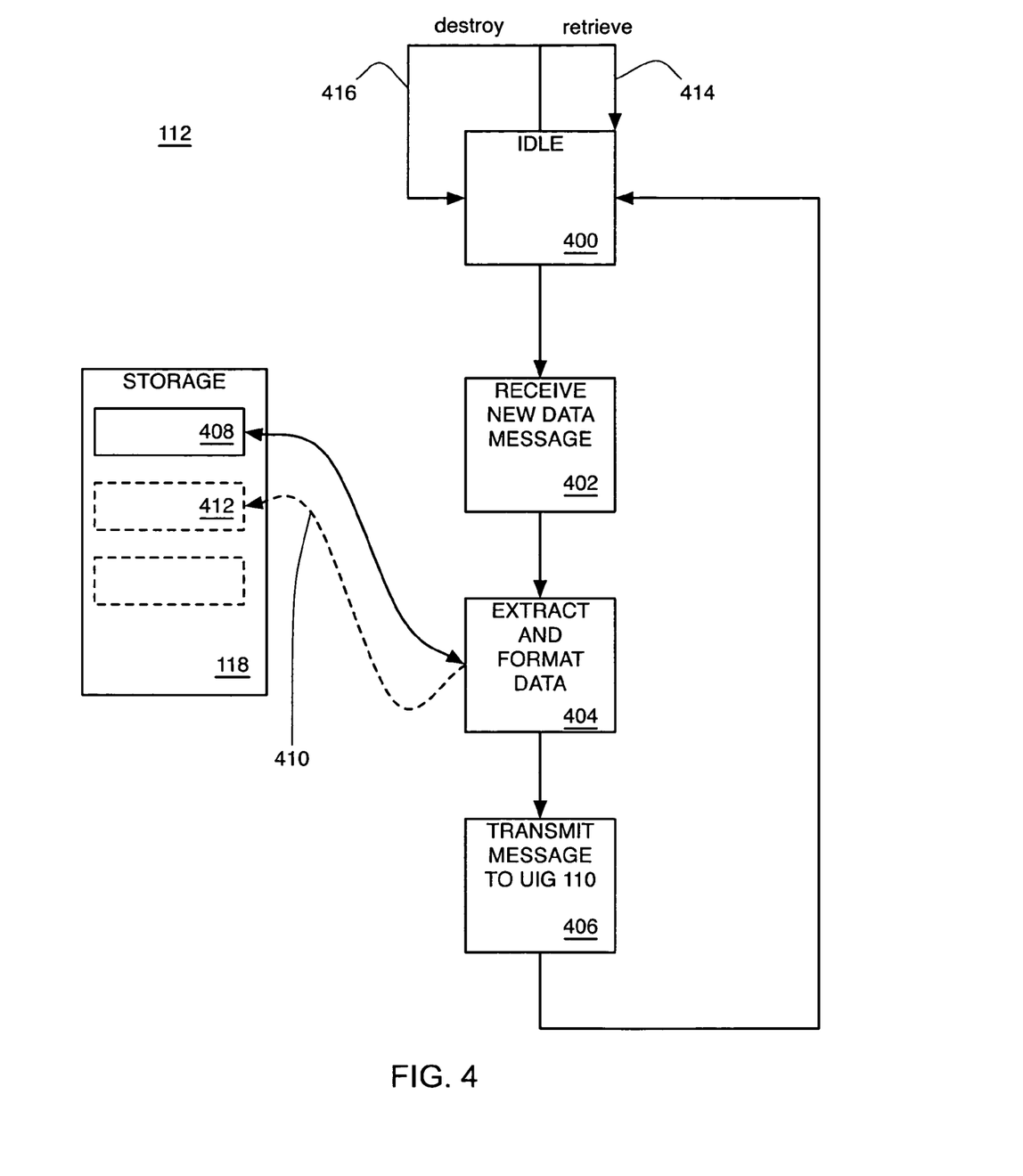
FIG. 4 is another process flow diagram of an embodiment.

FIG. 4 depicts a variation on the FIG. 3 embodiment in which status monitor 112 returns to idle step 400 in order to respond to the retrieve information message (as indicated by retrieve line 414) and the destroy information message (as indicated by destroy line 416). Operation of status monitor 112 in response to receipt of the retrieve information message and the destroy information message is as described above with respect to FIG. 3.

Figure 5:
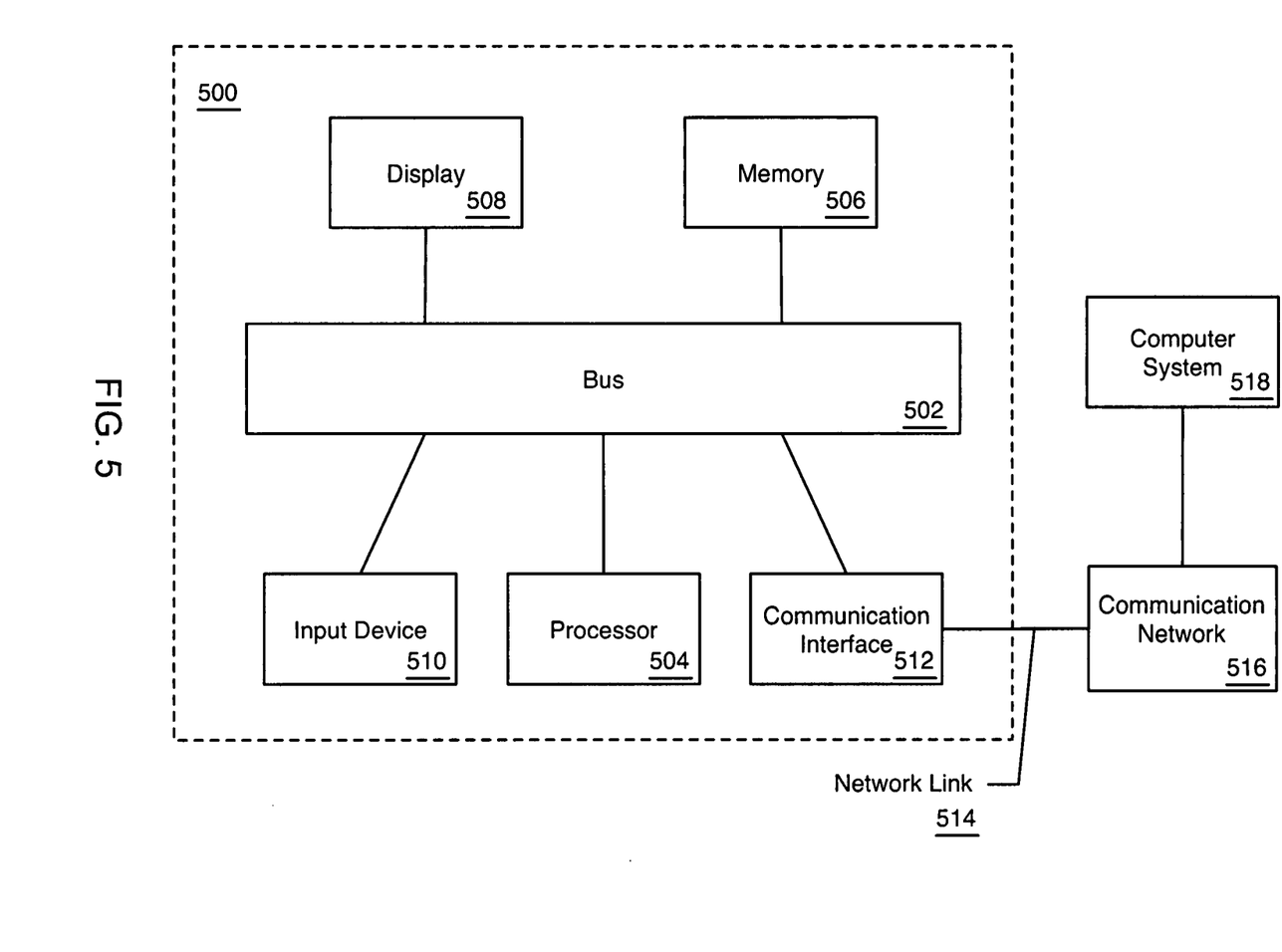
FIG. 5 is a high level block diagram of a computer system usable with an embodiment.

FIG. 5 is a block diagram illustrating an exemplary computer system 500 upon which an embodiment may be implemented. For example, processing device 100 includes one or more components of computer system 500. Computer system 500 includes a bus 502 or other communication mechanism for communicating information, and a processor 504 coupled with bus 502 for processing information. Computer system 500 also includes a memory 506, such as a random access memory (RAM) or other dynamic storage device, coupled to the bus 502 for storing instructions to be executed by processor 504. Memory 506 also may be used for storing status information and session IDs, temporary variables or other intermediate information during execution of instructions to be executed by processor 504.

Computer system 500 is coupled via bus 502 to display 508, such as a liquid crystal display (LCD) or other display technology, for displaying information to the user. Input device 510, described above, is coupled to bus 502 for communicating information and command selections to the processor 504.

According to an embodiment, computer system 500 operates in response to processor 504 executing sequences of instructions contained in memory 506, e.g., support framework 106, user interface generator 110, background service 104, status monitor 112, and status generator 114, and responsive to input received via input device 510, or communication interface 512. Such instructions may be read into memory 506 from a computer-readable medium or communication interface 512.

Execution of the sequences of instructions contained in memory 506 causes the processor 504 to perform the process steps described above. In other embodiments, hard-wired circuitry may be used in place of or in combination with computer software instructions to implement the embodiments. Thus, embodiments are not limited to any specific combination of hardware circuitry and software.

Computer system 500 also includes a communication interface 512 coupled to the bus 502. Communication interface 512 provides two-way data communication. For example, communication interface 512 may be a wireless communication link. In any such implementation, communication interface 512 sends and receives electrical, electromagnetic or optical signals which carry digital data streams representing various types of information. Of particular note, the communications through interface 512 may permit transmission or receipt of status information and session IDs for processing by status monitor 112 and status generator 114.

Network link 514 typically provides data communication through one or more networks to other devices. For example, network link 514 may provide a connection through communication network 516 to computer system 500 or to data equipment operated by a service provider (not shown). The signals through the various networks and the signals on network link 514 and through communication interface 512, which carry the digital data to and from computer system 500, are exemplary forms of carrier waves transporting the information.

Computer system 500 can send messages and receive data, including program code, through the network(s), network link 514 and communication interface 512. Received code may be executed by processor 504 as it is received, and/or stored in memory 506 for later execution. In this manner, computer system 500 may obtain application code in the form of a carrier wave.

Figure 6:
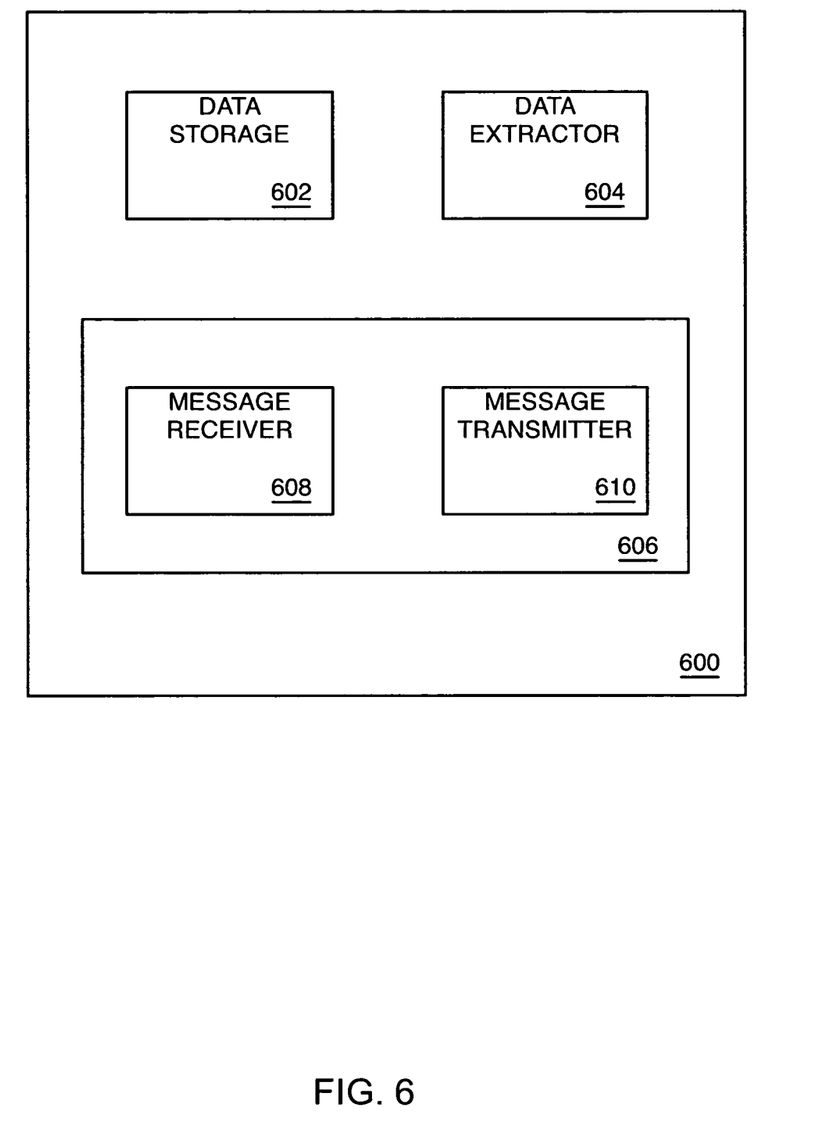
FIG. 6 is a high level functional block diagram of an inter-process communication object according to an embodiment.

FIG. 6 depicts a high level functional block diagram of an embodiment of an IPC COM object 600. IPC COM object 600 includes a data storage 602 for storing data and information, e.g., session ID 116 and status information and/or memory space 118, a data extractor 604 for extracting data stored in data storage 602, and a communication component 606. Communication component 606 communicates with other IPC COM objects and an enclosing host application which instantiated IPC COM object 600. Communication component 606 includes a message receiver 608 and a message transmitter 610 for receiving and transmitting communications to/from other IPC COM objects and the application, respectively. In another embodiment, message receiver 608 and message transmitter 610 are formed as a single transceiver element.

In accordance with an embodiment, a COM object is described which is operable as both a server and a client. An embodiment provides a simple and unique IPC mechanism implemented in a COM object. Because the IPC mechanism is a COM object, any application is able to use the COM object and corresponding IPC mechanism.

When two or more applications, e.g., user interface generator 110 and background service 104, need to communicate with each other, the applications instantiate a COM object as described above in each application's process space. The application serving information to other applications configures the instantiated COM object as a server. In an embodiment, the instantiated COM server object includes a unique session identifier. The remaining applications declare an instance of the COM object as a client with the unique session identifier. The instantiated COM server object accepts registrations using the session identifier from COM client objects.

After the COM server object has information, the COM server object causes allocation of memory in the registered COM client object's process boundary and copies the information. The COM server object then notifies the COM client objects by passing the address of the allocated memory location. The COM client object processes the information and provides the information to a host application.

Based on the above-described embodiment, the IPC mechanism is lightweight and does not consume much resources. As the COM object is developed, any application can use the IPC mechanism by instantiating the COM object. In order to assist smooth playback of media by device 100, more specifically by background service 104, the impact of generating and transmitting status information to status monitor 112 is reduced in comparison to previous approaches. Compared to conventional inter-process methods, each client using the above-described embodiment receive information very quickly from the server. Additionally, the server need not wait on a client communication or processing of received data. Conversely, clients need not watch or wait for data communication by the server.

No synchronization is required between the client and the server as the clients are the sole owners of the information stored in the client process space.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. An inter-process communication (IPC) processing device, comprising:
a processor executing sequences of instructions contained in memory comprising:
a status monitor configured to monitor a status of processing by a service;
a status generator configured to provide status information of the service processing to the status monitor; and
a framework configured to receive a memory allocation request from the status generator, allocate storage space within the status monitor, and return a reference to the allocated storage space to the status generator,
wherein, responsive to receipt of the allocation reference, the status generator is configured to store the status information in the allocated storage space and, after storing the status information, transmit a notification message including the reference to the allocated storage space storing the status information to the status monitor.

2. An IPC processing device as claimed in claim 1, wherein, responsive to receipt of the notification message from the status generator, the status monitor is configured to extract the status information stored in the allocated storage space and format the extracted status information according to one or more data types.

3. An IPC processing device as claimed in claim 2, wherein, after extracting the status information from the allocated storage space, the status monitor is configured to request the framework to destroy the allocated storage space.

4. An IPC processing device as claimed in claim 2, wherein the status monitor is configured to communicate the extracted and formatted status information to a user interface generator.

5. An IPC processing device as claimed in claim 1, wherein the IPC process is an IPC COM client object configured to communicate with another application process including an IPC COM server object.

6. An IPC processing device as claimed in claim 1, wherein the IPC process is an IPC COM server object configured to communication with another application process including an IPC COM client object.

7. An inter-process communication (IPC) system, comprising:
- means, implemented by a processor of the IPC system, for receiving a memory allocation request;
- means, implemented by the processor of the IPC system, for allocating storage space in response to the memory allocation request and returning a reference to the allocated storage space;
- means, implemented by the processor of the IPC system, for storing status information of a service in the allocated storage space in response to receiving the allocation reference, and, after storing the status information, transmitting a notification message including the reference to the allocated storage space storing the status information;
- means, implemented by the processor of the IPC system, for extracting the status information stored in the allocated storage space and formatting the extracted status information; and
- means, implemented by the processor of the IPC system, for communicating the extracted and formatted status information to a user interface generator.

8. A method of inter-process communication, comprising:
monitoring a status of processing by a service;
receiving a memory allocation request from a status generator providing status information of the service processing to a status monitor;
allocating storage space within the status monitor and returning a reference to the allocated storage space to the status generator; and
in response to receiving the allocation reference, storing the status information in the allocated storage space by the status generator and, after storing the status information, transmitting a notification message including the reference to the allocated storage space storing the status information from the status generator to the status monitor.

9. A method as claimed in claim 8, further comprising:
in response to receiving the notification message from the status generator, extracting the status information from the allocated storage space based on the reference of the notification message; and
formatting the extracted status information.

10. A method as claimed in claim 9, further comprising:
transmitting the extracted and formatted status information to a user interface generator.

11. A method as claimed in claim 9, further comprising:
allocating a second storage space in the status monitor and storing the extracted data in the allocated second storage space.

12. A method as claimed in claim 8, further comprising:
transmitting the status information to the status monitor from the status generator without a reply from the status monitor, and wherein, after transmitting the notification message to the status monitor, the status generator is freed up for other communications.

13. A method as claimed in claim 9, further comprising:
after extracting the status information from the allocated storage space, destroying the allocated storage space.

14. A memory or a non-transitory computer-readable medium storing instructions which, when executed by a processor, cause the processor to perform the method of claim 8.

15. A processing device comprising a processor configured to perform the method of inter-process communication as claimed in claim 8.

* * * * *